Jan. 26, 1960 S. GABRIELSON 2,922,689
RESETTABLE DEMAND RECORDER
Filed May 31, 1955 3 Sheets-Sheet 1

Inventor:
Samuel Gabrielson
by, Richard E. Hooley
His Attorney

Jan. 26, 1960     S. GABRIELSON     2,922,689
RESETTABLE DEMAND RECORDER
Filed May 31, 1955     3 Sheets-Sheet 2
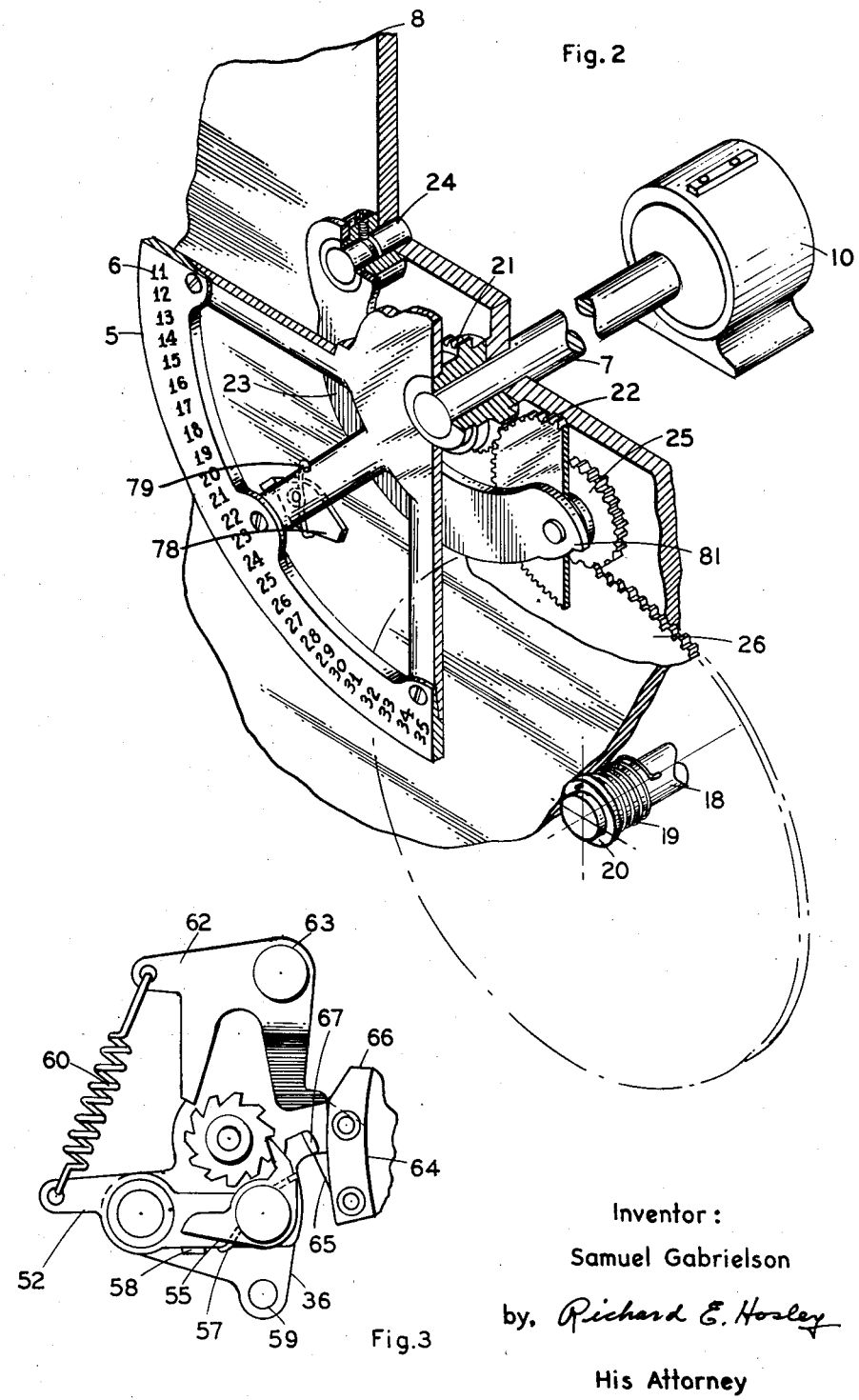
Inventor:
Samuel Gabrielson
by, Richard E. Hosley
His Attorney

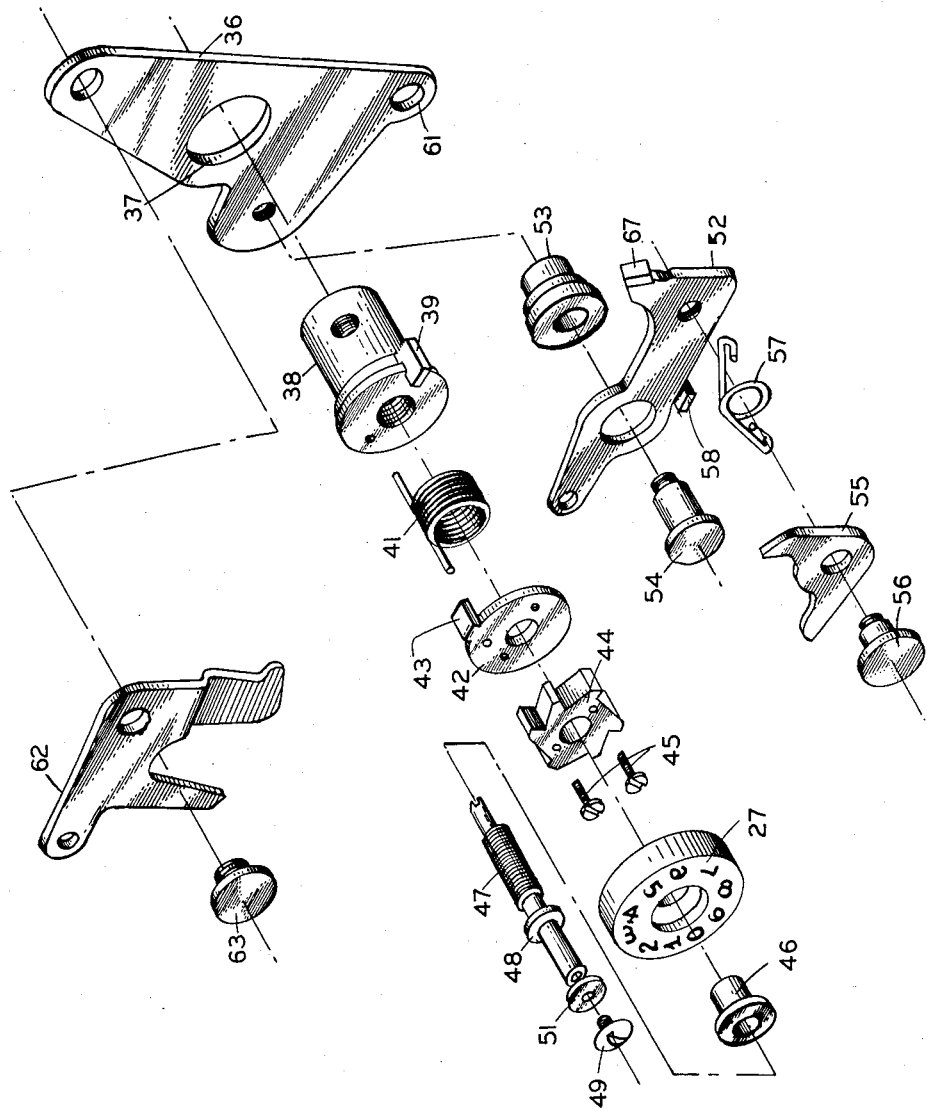

United States Patent Office 2,922,689
Patented Jan. 26, 1960

2,922,689

RESETTABLE DEMAND RECORDER

Samuel Gabrielson, Lynnfield, Mass., assignor to General Electric Company, a corporation of New York Application May 31, 1955, Serial No. 511,873

3 Claims. (Cl. 346—98)

This invention relates generally to improvements in recording devices and in particular to improvements in such a device adapted for use in a demand measuring system.

Heretofore it has been customary to provide a recorder for a demand measuring system so that a continuous record could be obtained of the demand measured in each succeeding demand interval. These recording devices have usually included a rotatably mounted wheel having consecutively numbered printing characters arranged thereon and adapted to be turned one number at a time in response to each impulse generated in the demand system. Such wheels were provided with printing characters ranging from 0 to 99 and required a plurality of rotations to measure any demand greater than the upper limit of the wheel. A suitable auxiliary wheel was usually added to cooperate with the main wheel to provide measurement of the demand in excess of the 99 demand impulses available from the main wheel. The auxiliary wheel would be advanced one number after each complete revolution of the main wheel and with suitable printing devices cooperating with the two wheels a record could be conveniently obtained.

The usual practice with recorders of the type described above was to provide a spring for resetting the recorder to a reference position after each demand interval and the operation was such that the spring would be wound up upon successive revolutions of the main recorder wheel. On reset the energy stored in the spring would drive the wheel back through a number of revolutions until the 0 reference position was reached after which time the device would be ready to receive impulses in the next demand interval.

Heretofore, the normal expected demand did not exceed 300 impulses in any demand interval and prior recorders were designed to accommodate this range of impulses resulting in but three complete revolutions of the main wheel for any demand measuring system. The design of the unit was such that resetting imposed no limitations on the use of the equipment when the number of demand impulses being measured did not exceed the intended range of the recorder.

However, the trend in demand measuring is to extend the range of impulses from 300 to 1000 or more in any demand interval and this change does impose limitations on the use of a recorder requiring reverse rotation for reset. Heavier springs must be used, longer intervals of time must be allowed for resetting, and in general the device gets more cumbersome and complex.

It is therefore an object of this invention to provide an improved recording device that is capable of responding to an unlimited number of incoming measuring pulses without requiring any complex or cumbersome resetting mechanisms.

It is another object of the invention to provide an improved recording device that can be periodically reset to a reference position in a minimum of time.

It is a further object of this invention to provide resetting means for a printing device wherein resetting can be accomplished in no more than one complete reverse revolution of a main printing wheel.

The invention comprises a recording device having a main printing wheel adapted to be successively advanced in response to successive energizing impulses received thereby. The main wheel can be rotated through an indefinite number of revolutions in response to the incoming impulses and after completion of each revolution, a second wheel is adapted to advance a fraction of a revolution such that the second wheel can cooperate with the first wheel to measure a quantity of incoming impulses as high as 1000 or more. The main wheel has a series of printing characters arranged thereon covering the numerical range of 0 to 99. The second wheel may have a similar arrangement of printing characters but limited to a numerical range of 0 to 9 in the case of a recorder intended to accommodate up to 1000 impulses.

The main wheel is arranged to rotate against a substantially constant torque device which may be in the form of a conventional stalled electric motor and adapted to be reset to its reference position by operation of the motor upon completion of the recording step in the measuring cycle. The auxiliary wheel is moved against a biasing spring which releases its energy upon resetting of the main wheel to accomplish necessary resetting.

It is not necessary to run the main wheel in a reverse direction through more than one revolution to accomplish resetting and in this respect, the recording device has been improved considerably over the prior art arrangements. The resetting drive means has been materially simplified and the time required for resetting has been significantly reduced.

The invention will be best understood upon reference to the detailed description set forth below, particularly when taken in conjunction with the drawings annexed hereto in which:

Figure 2 is a partial perspective view of the arrangement shown in Figure 1;

Figure 3 is an enlarged view of the actuating mechanism for the auxiliary printing wheel; and Figure 4 is an exploded view of the arrangement shown in Figure 3 with additional cooperating parts added thereto.

Figure 1:
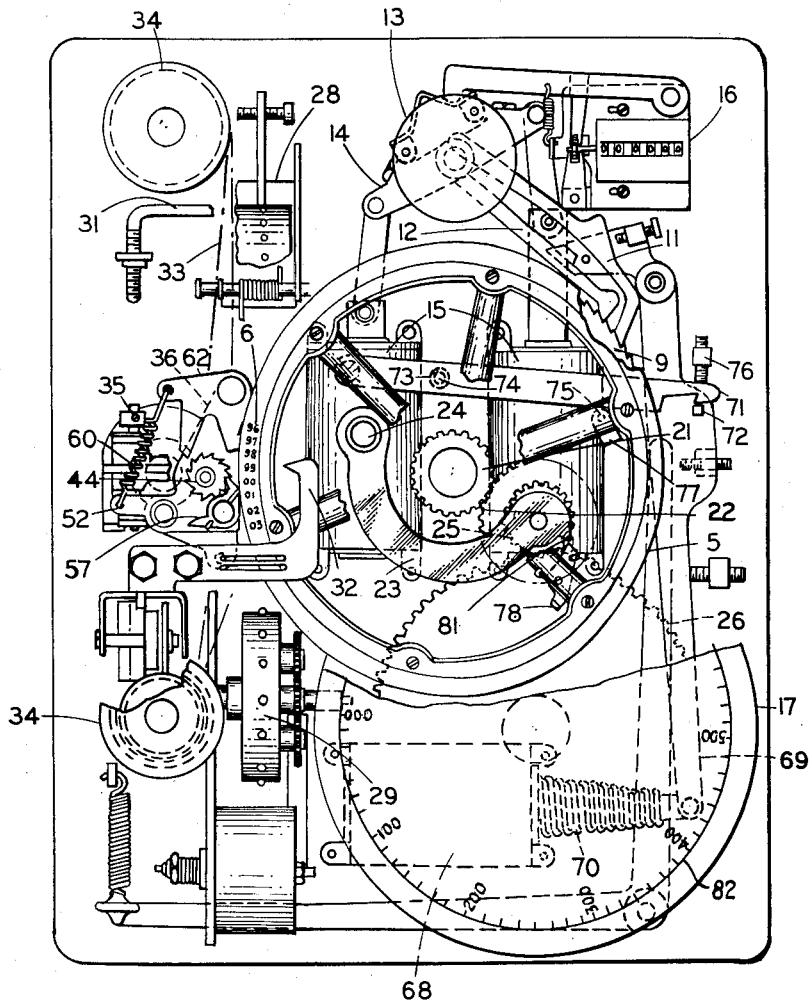
Figure 1 is a somewhat mechanical schematic view showing the invention as embodied in a printing recorder for a demand measuring system.

In general, the illustrated embodiment of the invention is in many respects similar to the recorder shown in U.S. Patent 1,742,072, issued December 31, 1929, to Chester I. Hall, and the two devices have many parts in common and also perform certain of their functions in a similar manner. In the interests of brevity and without sacrificing clarity or completeness, a great many parts of the device and their mode of operation will not be set forth in any great detail in view of the disclosure of the Hall patent. Starting with the main printing wheel 5, it is seen that it has an annular rim on which may be arranged a series of printing characters 6 numbered consecutively from 00 to 99. This rim is supported by suitable spokes which in turn are affixed to a hub which in turn is suitably keyed to a shaft 7, the shaft being journalled for rotation in a main supporting frame, a part of which is shown at 8.

The peripheral edge of wheel 5 is provided with a series of ratchet teeth 9 cooperating with a pair of pawls 11, 12. These pawls are connected in a known manner to a rocking mechanism of the walking beam type which includes the pivotally mounted member 13 having a rocker arm 14 to which is attached at its opposite extremities the actuating plungers of a pair of solenoids 15. Coupled to the shaft 7 there is provided a resetting drive motor 10 adapted to at all times furnish a constant torque for the shaft 7 tending to return the wheel 5 to its 0 reference position. The solenoids 15 are alternately actuated by the impulses coming in from the demand measuring system and this alternate actuation of the solenoids causes the pawls 11 and 12 to alternately advance the wheel 5 in a step-by-step manner one number at a time. The solenoids 15 drive the wheel against the restraining torque generated by the resetting motor and this actuation continues throughout the demand interval.

Also connected to the rocker mechanism by suitable actuating members is a conventional counter 16 adapted to respond in a known manner to each incoming impulse.

Also arranged to rotate with the wheel 5 is a totalizing indicating wheel 17 mounted on an auxiliary shaft 18 which in turn is suitably journalled for rotation in the main frame. As is shown in Figure 2, shaft 18 has a collar 20 rigidly mounted thereon and adapted to receive one end of a wind-up spring 19. The other end of spring 19 can be affixed to main frame 8 so that rotation of shaft 18 will wind up the spring and store energy therein. The energy thus stored in the spring can be used to reset wheel 17 in a manner to be described below.

The wheel 5 has adjacent its hub and rigidly affixed thereto, a gear 21 meshing with a gear 22 journalled for rotation in the cradle 23 pivotally mounted at 24 to the main frame 8. The gear 22 has integral therewith a pinion 25 adapted to cooperate with a gear 26 also affixed to shaft 18. Rotation of the main wheel 5 causes rotation of gear 26 through the gear drive described above and this causes indicating wheel 17 to advance one number at a time in response to each advance of the wheel 5. The dial 17 may have a scale, part of which is shown at 82 in Figure 1, ranging from 0 to 1000 to cooperate with a stationary index carried by the frame to indicate in the known manner the total number of impulses received at any time during the demand interval.

Cooperating with the wheel 5 and actuated thereby is a second auxiliary wheel 27 having a series of printing characters arranged annularly thereon and covering the numerical range from 0 to 9. The two wheels are substantially tangential to one another and for any relative position of the wheels, a printing character on each wheel will be contiguous, in the reference position, and adapted to cooperate with a suitable printing mechanism to produce the desired record.

Only a portion of the printing mechanism has been shown, but in substantially all respects it is similar to the printing mechanism shown in the aforesaid Hall patent. Thus, there is a supply roll of paper ribbon 28 arranged in a suitable supporting trough (not shown) and adapted to be drawn downwardly in a continuous manner over a portion of the printing wheels by means of the driving sprocket assembly generally shown at 29. The paper tape has a series of spaced centrally located perforations adapted to cooperate with the sprocket wheel, and it may be threaded over a suitable guide rod 31 arranged contiguous to the supply roll. Suitable paper tensioning devices may also be provided.

The reference position for the two printing wheels is indicated by the finger member 32 rigidly mounted on the main frame and provided with a plurality of slots through which the paper ribbon may be threaded. Carbon ribbon 33 is mounted in a known manner including the conventional spools 34 and it is adapted to be carried by a suitable platen (not shown) pivotally mounted to the frame at 35. The platen and a part of its supporting arm, together with the holding arrangements for the carbon ribbon have been omitted to permit a better showing of the actuating parts of the wheel 27, but it is to be understood that the operation is identical to the arrangement shown in the Hall patent. Thus, at the end of every demand interval a suitable mechanism is actuated to bring the platen, together with the carbon ribbon supported therein, down onto the paper ribbon for the purpose of printing the demand indicated by printing wheels. In other words, the printing mechanism cooperates in a known manner with the wheels 5 and 27 to print the measured demand.

As set forth above, the small print wheel 27 is adapted to advance one position upon each complete revolution of the large wheel 5 and the precise manner in which this is accomplished will now be described, having particular reference to Figures 1, 3 and 4. The wheel 27 and its associated cooperating parts are mounted upon a bracket 36 which in turn is secured in any convenient manner to the main frame of the recorder. The bracket 36 has an aperture 37 for receiving therein an internally threaded bushing 38 provided with a fixed stop 39. Mounted in front of the bushing 38 and lined up as shown in Figure 4, are the coil spring 41; the washer 42, having a tail 43 thereon; a ratchet wheel 44; and the printing wheel 27. Ratchet wheel 44 is securely affixed to the washer 42 by means of the screws 45 and the inner side of wheel 27 has a pair of annular recesses to accommodate the heads of screws 45. The auxiliary printing wheel, the ratchet wheel, and the washer are assembled together as a unit with the bushing 46 passing through their centrally disposed apertures and spun over on the inner face of the washer 42.

The auxiliary printing wheel assembly is attached to the shaft 47 and is drawn up against the flange 48 by the screw 49 and washer 51 mounted on the front of the shaft. With the auxiliary printing wheel assembly properly in place, the shaft 47 is then screwed into the bushing 38 such that the extended ends of spring 41 pass through suitable apertures in the ratchet assembly and the bushing 38. The spring 41 has a slight pre-wind so that the washer tail 43 cooperates with the upper side of stop 39 to position the 0 digit of the printing wheel 27 on a horizontal center line with the 00 digit of the large type wheel 5 in the reference position. In this way, the normal reference position of the two wheels is established and is indicated by the pointer formed on the extremity of finger 32.

An operating lever 52 is pivotally mounted on bracket 36 by means of the bushing 53 and the stud 54. A pawl 55 is pivotally mounted on lever 52 by means of the stud 56 and a single loop spring 57 is mounted on the stud 56 having one of its extremities hooked around the pawl 55 and its other extremity hooked around the bottom edge of operating lever 52 to urge the pawl 55 toward a stop ear 58 extending outwardly from the bottom edge of operating lever 52. Stop pin 59 is inserted in aperture 61 provided on bracket 36 to limit motion of the operating lever.

A locking pawl 62 is pivotally mounted on bracket 36 by means of a stud 63, and this pawl is connected to the operating lever 52 by means of a tension spring 60 having its ends hooked around suitable apertures provided in the connected parts.

Cooperating with the aforementioned mechanism there is a cam block 64 attached to the inner face of the large printing wheel in the vicinity of the 00 reference position and this cam block has a tooth-like projection 65 slightly below the horizontal center line establishing the reference position and a double inclined cam section 66 slightly above the reference center line. The position of the parts shown in Figure 3 corresponds to the 00 position of the large wheel 5.

With the above arrangement of parts in mind, it will be apparent that as the large wheel completes one revolution, the tooth section 65 will engage an inturned ear 67 formed on lever 52 and thereby move the lever in a counter-clockwise direction so that pawl 55 can index the printing wheel 27 to its next position. While this is occurring, the cam section 66 co-acts with pawl 62 to disengage it from ratchet wheel 44. The indexing of ratchet wheel 44 places torsion upon spring 41 and since the pawl 62 is momentarily disengaged, the forces necessary to hold the wheel in its new position are furnished by the driving pawls 11 and 12 cooperating with the large wheel 5. With the parts in this position, the two wheels together register an even 100 impulses. When the next impulse is received by the recorder, the large wheel advances one position permitting the tooth 65 to pass by the ear 67 thereby allowing the lever 52 and its associated pawls 55 to drop down on the stop pin 59. Likewise, the extremity of locking pawl 62 drops off of the cam section 66 and the pawl again engages the ratchet wheel 44 to hold it in place. This sequence of events may be repeated until the ninth digit of wheel 27 reaches the reference position. Should the large wheel 5 commence a tenth revolution in response to a quantity of impulses exceeding the normal expected rate in the demand interval, the tail 43 on washer 42 will have reached the upper side of stop 39 and will stall the recorder at the 999 impulse position.

Returning now to the large wheel 5, and assuming that it has partially completed one revolution after having rotated several complete revolutions and the end of the demand interval is reached, the aforesaid printing operation will take place after which the two wheels must be reset to their 000 reference position. A series of clock actuated contacts controls the recording and resetting operations of the device and when the resetting contacts are closed, a solenoid 68 is energized, thereby causing the pivotally mounted lever 69 to move in a clockwise direction against the counter forces developed by spring 70. When this occurs, the upper extremity of lever 69 lifts the pawls 11 and 12 from engagement with wheel 5 and the pivotally mounted locking bar 71 latches over the locking pin 72. Bar 71 is suitably pivoted at its inner extremity to the main frame and is also urged in a clockwise direction by means of a coiled spring 73 connected between it and the frame and surrounding a stud 74 extending rearwardly from the bar. When the resetting contacts close, they remain closed but momentarily, just long enough to permit the solenoid to move the lever 69 a sufficient distance to permit the locking bar 71 to drop over the latch pin 72 after which the reset contacts are opened and the solenoid 68 is de-energized. Were it not for the latching action between the locking bar and the latch pin, the arm 69 would be returned to its normal position by spring 70, re-engaging pawls 11 and 12 with ratchet teeth 9 so as to be ready for the next impulse coming into the actuating solenoids 15.

When the pawls 11 and 12 are disengaged from ratchet teeth 9, the motor 10 drives the wheel 5 in a counterclockwise direction until the stop pin 75 mounted on the inner face of one of the wheel spokes engages the locking bar 71 to unlatch it from arm 69 and drive it against the stop 76. The stop 76 may be adjusted so that when the stop pin 75 on wheel 5 comes to rest against the arm 71, the 00 printing characters are opposite the reference position established by finger 32.

When the arm 69 is unlatched, the energy stored in spring 70 will move it to its normal position thereby re-engaging the pawls 11 and 12 with the ratchet teeth 9. In this position the wheel 5 is ready to move in response to pulses coming into the solenoids 15, but a holding device external to the recorder prevents the pulses from coming in until a second printing operation occurs to record the 000 position of the printing wheels.

When the large wheel is traveling to its 00 reference position, the lever 52 and its associated pawl 55 are resting upon a stop pin 59 out of engagement with the ratchet wheel 44. Just as the wheel 5 reaches the 00 position, the inclined cam section 66 engages the operating extremity of pawl 62 to disengage the pawl from ratchet wheel 44. In this position of the parts, the small printing wheel assembly is essentially floating on the screw 47, and the energy stored in spring 41 resets the wheel 27 to its 0 reference position.

With the two wheels now in their 000 reference position, a suitable clock-controlled switch will again actuate the printing mechanism to record the reference position of the recording tape, after which the recorder will be in readiness for the next demand interval.

To permit the wheel 5 when rotating in a clockwise direction to pass the locking arm 71, the stop pin 75 has as an integral part thereof a beveled cam face 77 which is adapted upon contact with arm 71 to press it inwardly against spring 73 to thereby allow the wheel to pass by for the next revolution. The beveled cam face 77 is designed so that it drops off of arm 71 simultaneously with advancement of wheel 5 to the 101, 201, etc., position. In this way, when the two printing wheels are registering 100, 200, 300, etc., upon occurrence of resetting, the large wheel will be moved in a reverse direction a complete revolution until the stop pin 75 engages the arm 71 as aforesaid. As this occurs, the lever 52 and its associated pawl 55 will again move down on the stop pin 59 and upon completion of the reverse revolution by wheel 5, the cam section 66 engages the pawl 62 as aforesaid to unlatch the ratchet wheel 44 and permit the printing wheel 27 to return to 0. In this connection, it is to be noted that the spring 60 is at minimum tension when the lever 52 is on the stop 59 thereby requiring little force to disengage pawl 62 from the ratchet wheel 44.

As stated above, the indicating dial wheel 17 rotates in synchronism with the type wheel 5 to register the total number of impulses received by the recorder. Upon resetting of the recorder, the wheel 17 must also be reset and this is accomplished by means of the pawl 78 attached to one of the spokes of type wheel 5. Pawl 78 is pivotally mounted on its associated spoke but is restricted to a limited pivotal motion by means of the spring 79 connected between the mounting spoke and one end of the pawl.

The pawl 78 is adapted on reset to contact the toothed end 81 of arm 23 and lift the arm and its associated gears 22, 25 out of mesh with dial gear 26 permitting the spring 19 to reset the dial 17 to its 0 reference position. The spring 19 as aforesaid is biased between the dial 17 and a part of the main supporting frame so that it may be wound up slightly less than one full turn, upon maximum advancement of the dial 17.

During clockwise rotation of type wheel 5, the pawl 78 snaps by the toothed end of arm 23 because of the limited pivotal motion permitted by spring 79. As with the pin 75, the pawl 78 is adapted to snap by arm 23 when the large wheel is advanced to the 101, 201, 301, etc., positions. In the event of reset at the 101, 201, 301, etc., position, the wheel 5 moves enough in the reverse direction to produce the aforesaid resetting co-action between pawl 78 and toothed end 81.

Upon completion of the aforesaid cycle of events, namely advancement of the printing wheels and dial wheel during the demand interval, recording of the position of the type wheels at the end of the interval, resetting of all of the parts to the 000 reference position, and a final printing of the 000 reference position, a suitable externally operated device again operates to transmit impulses to the recorder for repetition of the aforesaid cycle during the next demand interval.

Thus, it is seen that resetting of the recorder involves no more than one complete reverse revolution of type wheel 5. Additionally, the auxiliary printing wheel 27 and the indicating dial wheel 17 are reset during the reverse rotation of type wheel 5 and as a result of the co-action between the resetting devices mounted on the wheel cooperating with the auxiliary type wheel and the indicating dial wheel.

The above arrangement of parts permits the recorder to accommodate as many as 999 impulses in a given demand interval and allows for resetting of the recorder in a minimum of time with a minimum of reverse motion. It has been found that the maximum resetting time is less than a second thereby making the device almost instantaneously ready for the next series of impulses to be recorded.

Although the illustrated embodiment discloses a step-by-step method of advancing the wheel 5, it is to be understood that the invention is equally adapted to a recorder having its main wheel advancing in a continuous manner. Additionally, the resetting torque could be supplied by a simple slip-spring arrangement although the stalled electric motor may be more desirable in the event that a slightly smoother acting device is required for a particular operation. Of importance in this connection is the fact that a very light spring could be used for resetting in place of the heavy spring required in the arrangement shown in the foresaid Hall patent.

Finally, although the printing wheel 27 has been shown with the digits 0 to 9 therein, the invention is equally applicable to a recorder having a greater number of digits on wheel 27. In other words, whereas the illustrated embodiment discloses a recorder adapted to accommodate a total of 999 impulses, the invention provides for a much greater number of impulses if so desired.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. In a recording demand meter, the combination of: a first rotatably mounted printing wheel having a sequential series of numerical indicia arranged around its peripheral edge and having a reference position; driving means engaging said first printing wheel for advancing it in a step-by-step manner from said reference position in response to the demand being measured, said first wheel being adapted to turn through a plurality of revolutions for total demand measurement; a second rotatably mounted printing wheel having a sequential series of numerical indicia arranged around its peripheral edge and having a reference position, said first and second wheels being mounted in close peripheral juxtaposition whereby the indicia of the two wheels together indicate the total demand being measured; means biasing said second wheel to its reference position; advancing means including means affixed to said first wheel for advancing said second wheel against said biasing means each time said first wheel completes one revolution; locking means for holding said second wheel in its advanced position; resetting means including means to disengage said driving means and means to return said first wheel to its reference position upon disengagement of said driving means; stop means co-operating with a portion of said first wheel to limit its return movement to no more than one complete revolution, said stop means being by-passed by said first wheel during its advance movement; and an unlocking member affixed to said first wheel operating to disengage said locking means from said second wheel when said first wheel is advancing said second wheel and when said first wheel returns to its reference position, said biasing means operating to return said second wheel to its reference position only when said locking means is disengaged during resetting of said first wheel.

2. The invention defined by claim 1 in which stop means is provided for said second wheel to prevent further movement of said first and second wheels when said second wheel completes one revolution.

3. The invention defined by claim 1 wherein means are provided to cooperate with said printing wheels to record the demand indicated thereby prior to return of the wheels to their reference positions.

References Cited in the file of this patent

UNITED STATES PATENTS

| | | |
|---|---|---|
| 1,483,432 | Hall | Feb. 12, 1924 |
| 1,742,072 | Hall | Dec. 31, 1929 |
| 2,544,610 | Nelson | Mar. 6, 1951 |
| 2,702,735 | Mirick et al. | Feb. 22, 1955 |